US011372423B2

(12) United States Patent
Holz et al.

(10) Patent No.: US 11,372,423 B2
(45) Date of Patent: Jun. 28, 2022

(54) ROBOT LOCALIZATION WITH CO-LOCATED MARKERS

(71) Applicant: Intrinsic Innovation LLC, Mountain View, CA (US)

(72) Inventors: Dirk Holz, Mountain View, CA (US); Elizabeth Murphy, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 101 days.

(21) Appl. No.: 17/034,795

(22) Filed: Sep. 28, 2020

(65) Prior Publication Data

US 2021/0011482 A1 Jan. 14, 2021

Related U.S. Application Data

(63) Continuation of application No. 16/150,482, filed on Oct. 3, 2018, now Pat. No. 10,824,160.

(60) Provisional application No. 62/738,903, filed on Sep. 28, 2018.

(51) Int. Cl.
*G05D 1/02* (2020.01)
*G01C 21/32* (2006.01)
*G05D 1/00* (2006.01)

(52) U.S. Cl.
CPC .......... *G05D 1/0234* (2013.01); *G01C 21/32* (2013.01); *G05D 1/0088* (2013.01); *G05D 2201/0216* (2013.01)

(58) Field of Classification Search
CPC ...... G05D 1/02; G05D 1/0234; G05D 1/0088; G01C 21/32
See application file for complete search history.

(56) References Cited

U.S. PATENT DOCUMENTS 5,995,884 A * 11/1999 Allen ................... G05D 1/0234
701/25
6,965,209 B2 11/2005 Jones et al.
(Continued)

FOREIGN PATENT DOCUMENTS

EP 1331537 7/2003
WO 2017/020317 2/2014

OTHER PUBLICATIONS

Arya et al., "An Optimal Algorithm for Approximate Nearest Neighbor Searching in Fixed Dimensions," Journal of the ACM, Nov. 1998, pp. 891-923, vol. 45, No. 6.
(Continued)

*Primary Examiner* — Tan Q Nguyen
(74) *Attorney, Agent, or Firm* — McDonnell Boehnen Hulbert & Berghoff LLP

(57) ABSTRACT

One method disclosed includes identifying, in a map of markers fixed in an environment, two co-located markers within a threshold distance of each other, where each of the two co-located markers has a non-overlapping visibility region. The method further includes determining a set of detected markers based on sensor data from a robotic device. The method additionally includes identifying, from the set of detected markers, a detected marker proximate to a first marker of the two co-located markers. The method also includes enforcing a visibility constraint based on the non-overlapping visibility region of each of the two co-located markers to determine an association between the detected marker and a second marker of the two co-located markers. The method further includes determining a location of the robotic device in the environment relative to the map based on the determined association.

20 Claims, 11 Drawing Sheets

(56) References Cited

U.S. PATENT DOCUMENTS

| | | |
|---|---|---|
| 9,679,381 B2 | 6/2017 | Martini |
| 2003/0208304 A1 | 11/2003 | Peless et al. |
| 2008/0033645 A1 | 2/2008 | Levinson et al. |
| 2008/0262718 A1 | 10/2008 | Farwell |
| 2011/0310087 A1 | 12/2011 | Wright, Jr. et al. |
| 2012/0323431 A1 | 12/2012 | Wong et al. |
| 2013/0138246 A1* | 5/2013 | Gutmann ............... G01C 21/12 901/1 |
| 2014/0240501 A1 | 8/2014 | Newman et al. |
| 2014/0241576 A1 | 8/2014 | Yu et al. |
| 2015/0031390 A1 | 1/2015 | Robertson et al. |
| 2016/0298970 A1* | 10/2016 | Lindhe ................ A47L 11/4066 |

OTHER PUBLICATIONS

Besl et al., "A Method for Registration of 3-D Shapes," IEEE Transactions on Pattern Analysis and Machine Intelligence, Feb. 1992, pp. 239-256, vol. 14, No. 2.

Elseberg et al., "Comparison of nearest-neighbor-search strategies and implementations for efficient shape registration.", Journal of Software Engineering for Robotics (JOSER), Feb. 2012, 12 pages.

Muja et al., "Fast Approximate Nearest Neighbors with Automatic Algorithm Configuration," in International Conference on Computer Vision Theory and Applications (VISAPP'09), 2009, 10 pages.

Segal et al., "Generalized-ICP," Robotics: Science and Systems V, Jun. 28-Jul. 1, 2009, 9 pages.

* cited by examiner

ROBOT LOCALIZATION WITH CO-LOCATED MARKERS

CROSS REFERENCE TO RELATED APPLICATION

The present application is a continuation of U.S. patent application Ser. No. 16/150,482 filed on Oct. 3, 2018, which claims priority to U.S. Provisional Application No. 62/738,903 filed on Sep. 28, 2018, the entire contents of each application are incorporated herein by reference, as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

In one embodiment, a method is provided that includes identifying, in a map of markers fixed in an environment, two co-located markers within a threshold distance of each other, where each of the two co-located markers has a non-overlapping visibility region. The method additionally includes determining a set of detected markers based on sensor data from a robotic device. The method also includes identifying, from the set of detected markers, a detected marker proximate to a first marker of the two co-located markers. The method further includes enforcing a visibility constraint based on the non-overlapping visibility region of each of the two co-located markers to determine an association between the detected marker and a second marker of the two co-located markers. The method also includes determining a location of the robotic device in the environment relative to the map based on the determined association.

In another embodiment, a robotic device is provided which includes a control system. The control system is configured to identify, in a map of markers fixed in an environment, two co-located markers within a threshold distance of each other, where each of the two co-located markers has a non-overlapping visibility region. The control system is further configured to determine a set of detected markers based on sensor data from a robotic device. The control system is also configured to identify, from the set of detected markers, a detected marker proximate to a first marker of the two co-located markers. The control system is additionally configured to enforce a visibility constraint based on the non-overlapping visibility region of each of the two co-located markers to determine an association between the detected marker and a second marker of the two co-located markers. The control system is further configured to determine a location of the robotic device in the environment relative to the map based on the determined association.

In a further embodiment, a non-transitory computer readable medium is disclosed comprising program instructions executable by at least one processor to cause the at least one processor to perform functions. The functions include identifying, in a map of markers fixed in an environment, two co-located markers within a threshold distance of each other, where each of the two co-located markers has a non-overlapping visibility region. The functions further include determining a set of detected markers based on sensor data from a robotic device. The functions also include identifying, from the set of detected markers, a detected marker proximate to a first marker of the two co-located markers. The functions additionally include enforcing a visibility constraint based on the non-overlapping visibility region of each of the two co-located markers to determine an association between the detected marker and a second marker of the two co-located markers. The functions further include determining a location of the robotic device in the environment relative to the map based on the determined association.

In another embodiment, a system is provided that includes means for identifying, in a map of markers fixed in an environment, two co-located markers within a threshold distance of each other, where each of the two co-located markers has a non-overlapping visibility region. The system additionally includes means for determining a set of detected markers based on sensor data from a robotic device. The system also includes means for identifying, from the set of detected markers, a detected marker proximate to a first marker of the two co-located markers. The system further includes means for enforcing a visibility constraint based on the non-overlapping visibility region of each of the two co-located markers to determine an association between the detected marker and a second marker of the two co-located markers. The system also includes means for determining a location of the robotic device in the environment relative to the map based on the determined association.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
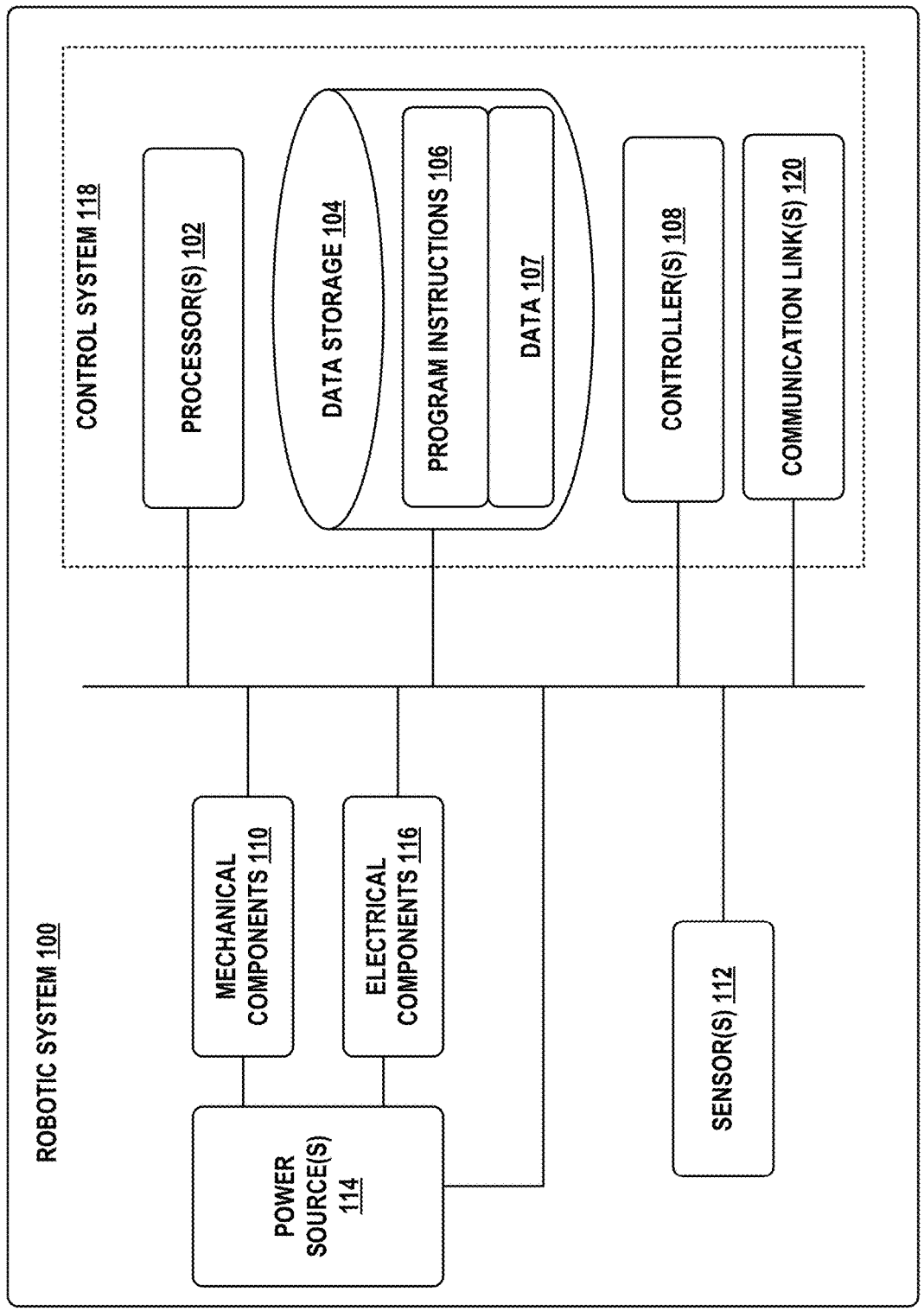
FIG. 1 illustrates a block diagram of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

In warehouse installations with Automated Guided Vehicles (AGVs), localization of the vehicles, e.g., determining their position and orientation in the warehouse, is often done with artificial landmarks such as retro-reflective markers. Sensors on-board the vehicles may be used to detect such markers and localize in a known marker setup of the warehouse. Such a marker setup may be achieved by planning the layout of artificial landmarks and installing markers as indicated by the planned layout. Subsequently, a map of the markers may be generated by surveying the positions of the landmarks or automatically building a map of the setup (e.g., by having one or more robots run a simultaneous localization and mapping or SLAM process).

Markers may generally be fixed at different positions of a horizontal plane so that a two-dimensional map will suffice for robot localization. Some systems may use markers which are visible from any orientation in the horizontal plane (e.g., cylindrical reflectors with a 360 degree field of visibility). In such systems, only (X,Y) positions of the reflectors may need to be determined as part of SLAM to be used for robot localization. However, it may be beneficial in some setups to use markers with a limited field of visibility. For instance, flat reflectors with a cone of visibility may be fixed in the environment and mapped as part of a robot localization process. Because the field of visibility of a reflector depends on the orientation of the reflector in addition to the position, using flat reflectors may create additional challenges in mapping and robot localization.

In some layouts, it may be desirable to position markers with limited fields of visibility relatively close to each other. For instance, two reflectors may be positioned on opposite sides of a column in a warehouse such that the two reflectors are oriented substantially opposite each other. In such a scenario, a classical localization method (e.g., an iterative closest point or ICP search which matches a set of detections to markers in a map based only on distance) may incorrectly associate a detected marker to the wrong marker in the map, resulting in a poor robot localization estimate.

Example methods and processes are provided that may help to allow for accurate robot localization in a system with markers that are located close together. More specifically, co-located markers may be identified in a map as markers within a threshold distance of each other. The threshold may be defined based on the resolution of a sensor on a robotic device using the markers for localization. During a data association step, a visibility constraint may be enforced to associate a detected marker with the correct marker in the map. By improving the accuracy of the association step, robot localization accuracy may also be improved in a system with co-located markers.

In some examples, robot localization may involve doing an ICP search for a transformation that best maps observed reflectors in a robot sensor scan to a map, seeded with the last estimated pose of the robot in the map frame. The ICP search may rely on a nearest neighbor search to iteratively re-estimate the best corresponding point in the map for a given observation. In some examples, the nearest neighbor search may be based on a distance transform which enables a fast grid-based lookup to find the two-dimensional coordinates (X,Y) and an identifier of the nearest mapped reflector for an observation. This discretization by position only may not handle the case of co-located markers because it will return the index of only one of the co-located markers in a particular grid cell.

To handle co-located markers, situations may be identified where a detected marker is initially associated to one of two or more co-located markers. For instance, a nearest neighbor search may initially identify one mapped marker from a group of co-located markers as a potential match (e.g., based on proximity to an observation). The visibility constraint may then be enforced for each of the co-located markers to find the closest match of the co-located markers which should also be visible from the robot sensor's current position. A non-overlapping visibility region for co-located markers may be enforced (e.g., in reflector layout tools and/or during SLAM when maps are created) to ensure that multiple co-located reflectors are not visible from any robot sensor position.

The visibility constraint itself may involve checking whether an angle between a measurement ray and a reflector normal is consistent with the visibility cone of the reflector. The measurement ray may be drawn between the mapped reflector and a current sensor position of a sensor (e.g., lidar) on the robot. In order to determine whether the angle is consistent with the mapped reflector being detectable from a given robot position, the dot product of the two vectors may be evaluated.

In some examples, a map of marker positions may initially be preprocessed to construct a lookup table of co-located markers. The lookup table may allow for fast computation of correct associations between a detected marker and one of a set of co-located markers in the map during the iterative closest point process.

In further examples, an iterative closest point process may only involve enforcing visibility constraints for co-located markers. If a marker does not have any co-located markers, the visibility constraint may not be enforced in order to avoid rejecting true associations between a detected marker and a mapped marker, and unnecessary processing.

Example methods may therefore allow for accurate and efficient robot localization while allowing a manager of a warehouse or other environment flexibility in placing reflectors close together. Such arrangements with co-located reflectors may be particularly beneficial when using reflectors with limited fields of visibility. A control system may use the robot localization information to control a robot to navigate, perform tasks, or otherwise operate in an environment with co-located reflectors.

Referring now to the Figures, FIG. 1 illustrates an example configuration of a robotic system that may be used in connection with the embodiments described herein. Robotic system 100 may be configured to operate autonomously, semi-autonomously, or using directions provided by user(s). Robotic system 100 may be a vehicle implemented in various forms, such as forklifts, pallet jacks, AGVs, cars, or trucks. Other forms are possible as well. Furthermore, robotic system 100 may also be referred to as a robot, robotic device, mobile robot, or robotic vehicle, among other designations.

As shown in FIG. 1, robotic system 100 may include processor(s) 102, data storage 104, and controller(s) 108, which together may be part of a control system 118. Robotic system 100 may also include sensor(s) 112, power source(s) 114, mechanical components 110, electrical components 116, and communication link(s) 120. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, electrical components 116, or communication link(s) 120.

Data storage 104 may be one or more types of hardware memory. For example, data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, data storage 104 can be a single physical device. In other embodiments, data storage 104 can be implemented using two or more physical devices, which may communicate with one another via wired or wireless communication. As noted previously, data storage 104 may include computer-readable program instructions 106 and data 107. Data 107 may be any type of data, such as configuration data, sensor data, and/or diagnostic data, among other possibilities.

Controller 108 may include one or more electrical circuits, units of digital logic, computer chips, and/or microprocessors that are configured to (perhaps among other tasks) interface between any combination of mechanical components 110, sensor(s) 112, power source(s) 114, electrical components 116, control system 118, communication link(s) 120, or users of robotic system 100. In some embodiments, controller 108 may be a purpose-built embedded device for performing specific operations with one or more subsystems of robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. For instance, control system 118 may include various components for communicating with robotic system 100, including a joystick, buttons, and/or ports, etc. The example interfaces and communications noted above may be implemented via a wired or wireless connection, or both. Control system 118 may perform other operations for robotic system 100 as well.

In some implementations, control system 118 of robotic system 100 may also include communication link(s) 120 configured to send and receive information. Communication link(s) 120 may transmit data indicating the state of the various components of robotic system 100. For example, information read by sensor(s) 112 may be transmitted via communication link(s) 120 to a separate device. Other diagnostic information indicating the integrity or health of power source(s) 114, mechanical components 110, electrical components 116, processor(s) 102, data storage 104, or controller 108 may be transmitted via communication link(s) 120 to an external communication device.

In some implementations, robotic system 100 may receive information at communication link(s) 120 that is then processed by processor(s) 102. The received information may indicate data that is accessible by processor(s) 102 during execution of program instructions 106. Further, the received information may change aspects of controller(s) 108 that may affect the behavior of mechanical components 110 or electrical components 116. In some cases, the received information may indicate a query requesting a piece of information (e.g. the operational state of one or more of the components of robotic system 100). Processor(s) 102 may subsequently transmit the piece of information back out via communication link(s) 120.

In some cases, communication link(s) 120 may include a wired connection. Robotic system 100 may include one or more ports to interface communication link(s) 120 to an external device. Communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, control system 118 may communicate with other systems of robotic system 100 via wired or wireless connections, and may further be configured to communicate with one or more users or operators of the vehicle. As one possible illustration, control system 118 may receive an input (e.g., from a central control system, from a user, or from another vehicle) indicating an instruction to move a pallet from a first location of a warehouse to a second location of the warehouse. The input to control system 118 may be received via communication link(s) 120.

Based on this input, control system 118 may perform operations to cause robotic system 100 to use sensors 112 to analyze the environment of the warehouse to locate the pallet and subsequently use mechanical components 110 to pick up and move the pallet.

Operations of control system 118 may be carried out by processor(s) 102. Alternatively, these operations may be carried out by controller 108, or a combination of processor(s) 102 and controller 108. In some embodiments, control system 118 may partially or wholly reside on a device other than robotic system 100, and therefore may at least in part control robotic system 100 remotely. Communication link(s) 120 may be used at least in part to carry out the remote communication.

Mechanical components 110 represent hardware of robotic system 100 that may enable robotic system 100 to perform physical operations. As a few examples, robotic system 100 may include physical members such robotic arm(s), wheel(s), track(s), linkage(s), and/or end effector(s). The physical members or other parts of robotic system 100 may further include motors and actuators arranged to move the physical members in relation to one another. Robotic system 100 may also include one or more structured bodies for housing control system 118 or other components, and may further include other types of mechanical components. Mechanical components 110 used in a given robot may vary based on the design of the robot, and may also be based on the operations and/or tasks the robot may be configured to perform.

In some examples, mechanical components 110 may include one or more removable components. Robotic system 100 may be configured to add and/or remove such removable components, which may involve assistance from a user and/or another robot. For example, robotic system 100 may be configured with removable arms, linkages, and/or end effectors so that these members can be replaced or changed as needed or desired based on a task robotic system 100 is expected or planned to perform. In some embodiments, robotic system 100 may include one or more removable and/or replaceable battery units or sensors. Other types of removable components may be included within some embodiments.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for reflector detection, short-range object detection, distance determination, and/or speed determination), SONAR (e.g., for underwater object detection, distance determination, and/or speed determination), VICON® (e.g., for motion capture), one or more cameras (e.g., stereoscopic cameras for three-dimensional (3D) vision), a global positioning system (GPS) transceiver, and/or other sensors for capturing information of the environment in which robotic system 100 is operating. Sensor(s) 112 may monitor the environment in real time, and detect obstacles, elements of the terrain, weather conditions, temperature, and/or other aspects of the environment.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such the operation of wheels, linkages, actuators, end effectors, and/or other mechanical and/or electrical features of robotic system 100. The data provided by sensor(s) 112 may enable control system 118 to determine errors in operation as well as monitor overall operation of components of robotic system 100.

Sensor(s) 112 may include one or more velocity and/or acceleration sensors. Sensor(s) 112 may measure both linear and angular velocity and/or acceleration. For instance, sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicated discussed herein. Additionally or alternatively, robotic system 100 may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, and/or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Power source(s) 114 may charge using various types of charging, such as wired connections to an outside power source, wireless charging, combustion, or other examples.

Electrical components 116 may include various mechanisms capable of processing, transferring, and/or providing electrical charge or electric signals. Among possible examples, electrical components 116 may include electrical wires, circuitry, and/or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to mechanical components 110, for example. Further, robotic system 100 may include electric motors. Other examples of electrical components 116 may exist as well.

Although not shown in FIG. 1, robotic system 100 may include a chassis and/or an operator cabin, which may connect to or house components of robotic system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry sensor(s) 112. These sensors may be positioned in various locations on robotic system 100, such as on top of the chassis to provide a high vantage point for sensor(s) 112.

Robotic system 100 may carry a load, such as a type of cargo that is to be transported. The load may also represent external batteries or other types of power sources (e.g., solar panels) that robotic system 100 may utilize. Carrying the load represents one example use for which robotic system 100 may be configured, but robotic system 100 may be configured to perform other operations as well.

Figure 2:
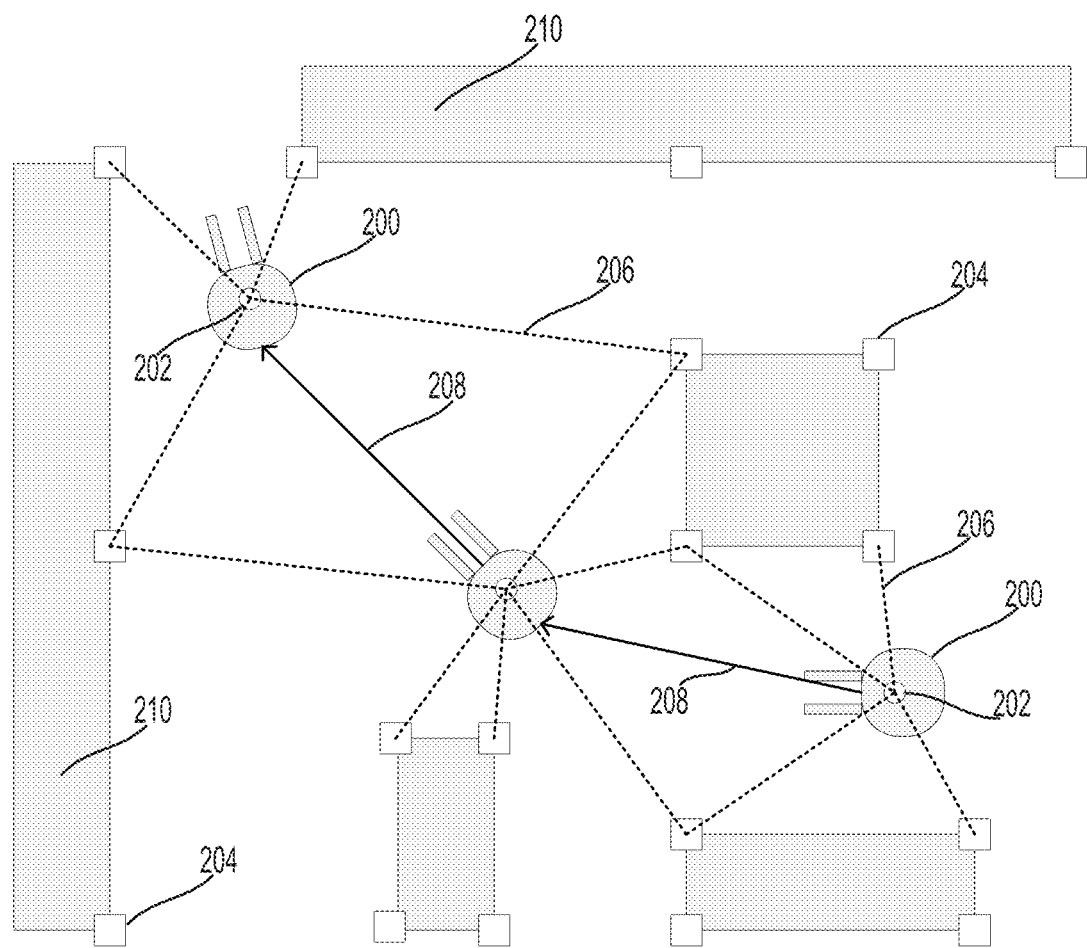
FIG. 2 shows a robot navigating within an environment, in accordance with example embodiments.

FIG. 2 shows a robot navigating within an environment, in accordance with example embodiments. A location and orientation of a robot 200 may be estimated, and the robot may navigate through the environment accordingly. The location and orientation of the robot may be referred to as the "pose" of the robot. The pose of the robot may be estimated based on received signals 206 by one or more sensors 202 of the robot. The received signals may be associated with landmarks 204 distributed throughout the environment. For example, the signals may be reflected by retroreflective markers placed in various locations along a substantially horizontal plane in a warehouse. In this example, the robot may include a light ranging and detection (LIDAR) unit that emits light to an area surrounding the robot, and retroreflectors positioned in the area surrounding the robot may reflect the light back to the robot for detection by one or more sensors of the robot.

In some examples, the received signals may indicate locations of the landmarks relative to the robot. Further, the locations of the landmarks within the environment may be mapped. Matching the received signals with corresponding mapped landmarks may thus allow the pose of the robot within the environment to be inferred. For example, the robot may align detected landmarks with the mapped landmarks to determine its position on the map. Further, information about reflectors (e.g., position information) may be updated in the map as part of a simultaneous localization and mapping or SLAM procedure. Additionally, the locations of the landmarks in relation to obstacles 210 within the environment may also be mapped in the same or a different map. For example, the locations of physical surfaces in the environment may be represented as an occupancy grid of occupied voxels, where the occupancy grid is aligned with the map of landmarks. The robot may make movements 208 to navigate within the environment while avoiding the obstacles based on the estimated pose of the robot and the mapped locations of the obstacles.

Figure 3:
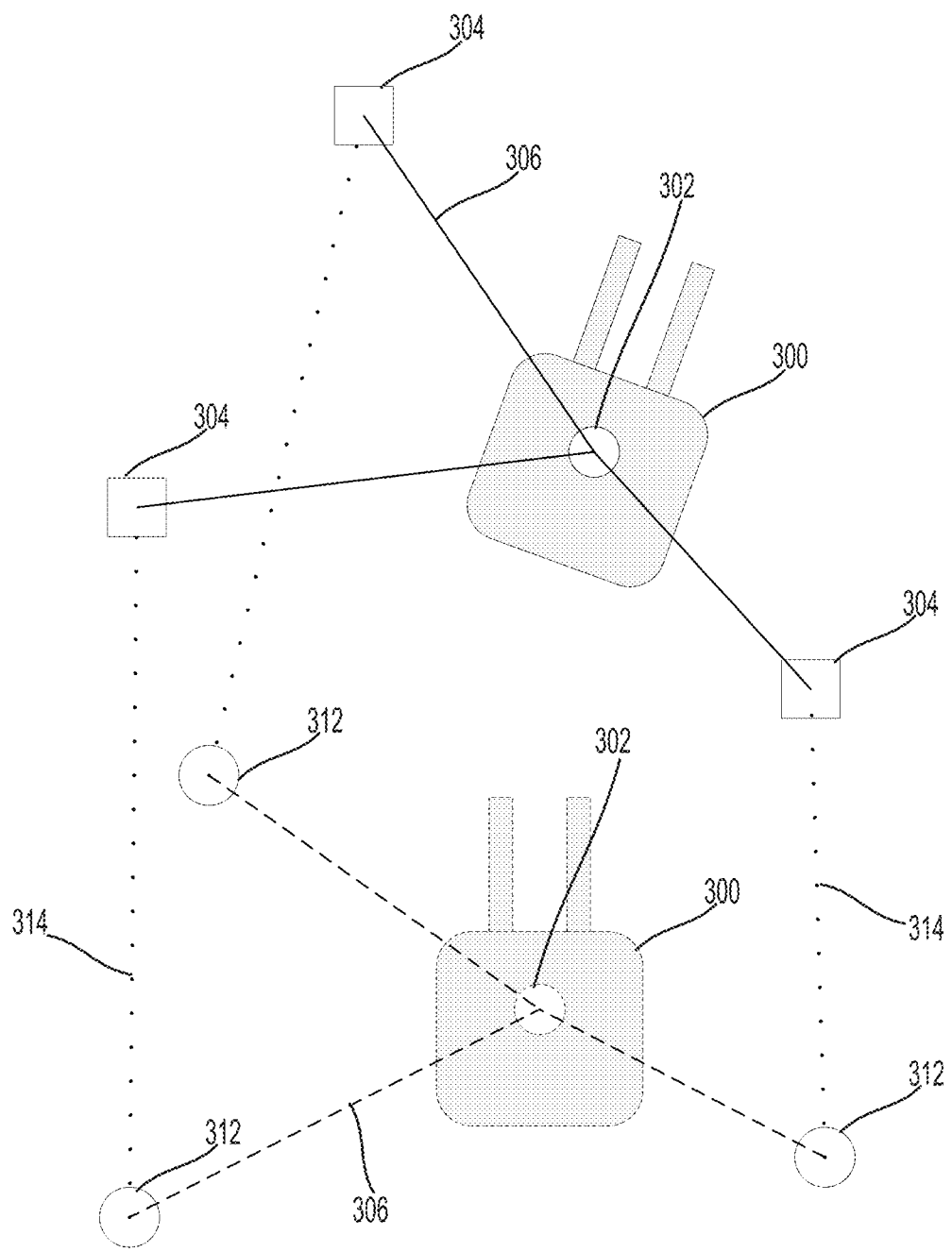
FIG. 3 shows a robot associating detections with mapped landmarks, in accordance with example embodiments.

FIG. 3 shows a robot associating detections with mapped landmarks, in accordance with example embodiments. Detected signals 306 from detected landmarks 312 may be received by one or more sensors 302 of a robot 300. The signals may be indicative of locations of the detected landmarks in relation to the robot. The detected landmarks may be transformed to align with mapped landmarks 304. Associations 314 may be formed between the detected landmarks and the mapped landmarks that result in a minimal distance between the transformed detected landmarks and the mapped landmarks. For example, a transformation based on the associations 314 may be determined using a least means squared method such as an iterative closest point (ICP) method. The detected landmarks may be translated and rotated based on the associations 314 between the detected landmarks and the mapped landmarks. The pose of the robot may be inferred by similarly translating and rotating the robot.

Figure 4:
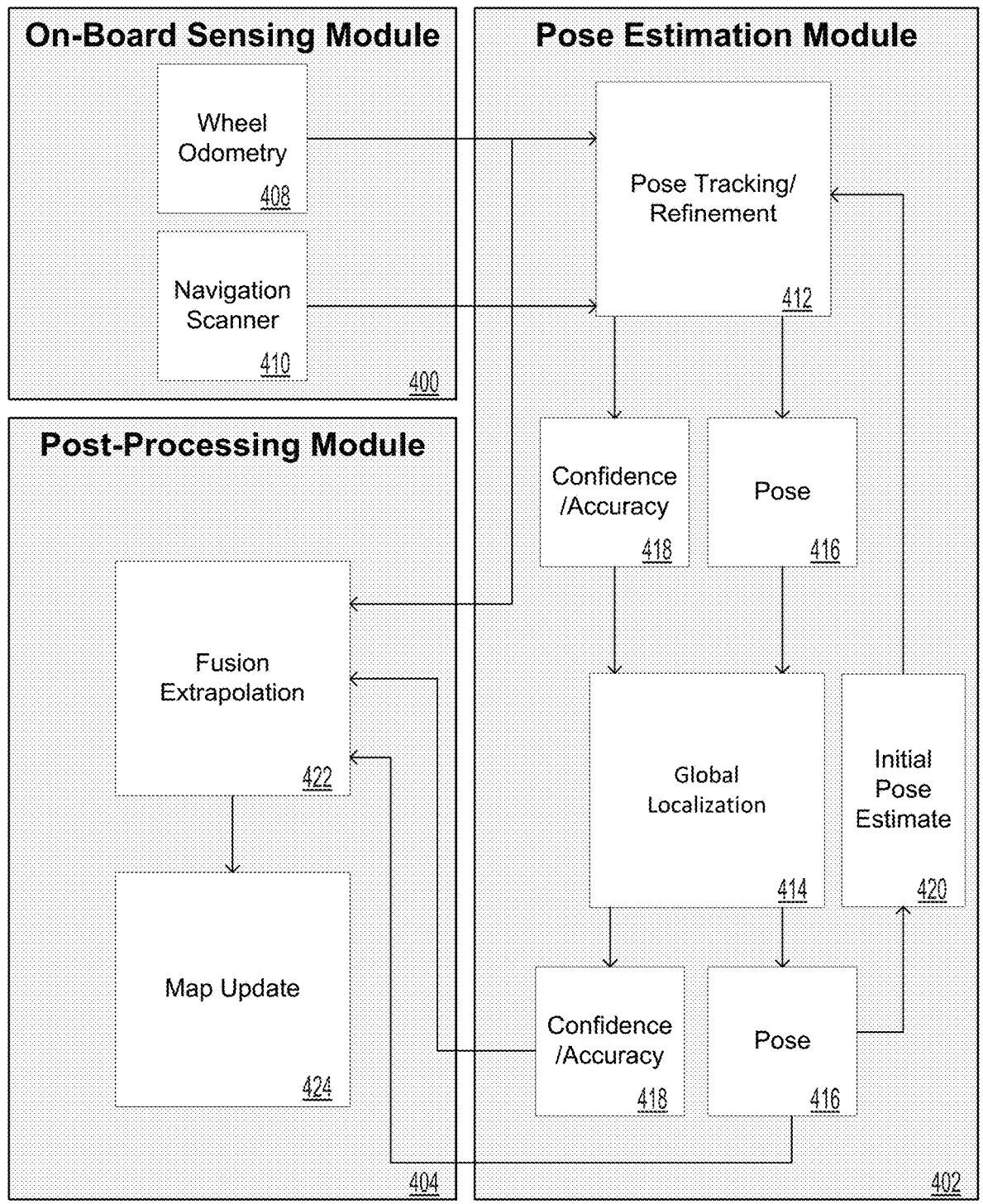
FIG. 4 is a functional block diagram illustrating modules of a robot control system, in accordance with example embodiments.

FIG. 4 is a functional block diagram illustrating modules of a robot control system, in accordance with example embodiments. The robot control system may include one or more sensors as part of an on-board sensing module 400. The sensors may provide data that is indicative of wheel odometry 408 of the robot. The sensors may also include a navigation scanner 410. The navigation scanner 410 may be configured to receive signals from landmarks in an environment of the robot.

A pose estimation module 402 of the robot control system may indicate the location and orientation of the robot with respect to mapped landmarks in the environment. The pose estimation module 402 may include software that performs functions based on inputs from the on-board sensing module 400. For example, each time the navigation scanner 410 performs a scan, sensor data from the on-board sensing module may be processed by the pose estimation module 402 to determine a current location and orientation of the robot in the environment. The pose tracking/refinement block 412 and global localization block 414 of the pose estimation module 402 represent processing steps, while the pose block 416, confidence/accuracy block 418, and initial pose estimate block 420 represent outputs of the processing blocks 412 and 414.

The pose estimation module 402 may operate in two modes. In a first mode, the pose estimation module 402 may have an initial pose estimate 420 of the robot, and the pose tracking/estimate block 412 may update the initial pose estimate 420. The pose tracking/refinement block 412 may utilize the wheel odometry 408 and data from the navigation scanner 410 in conjunction with the initial pose estimate 420 to identify the location of the robot in relation to detected landmarks. The pose tracking/refinement block 412 may associate the detected landmarks to particular mapped landmarks that are near to the initial pose estimate 420. The pose estimation module 402 may further provide a pose estimate 416 based on the association, and a confidence/accuracy 418 of the pose estimate. The confidence/accuracy 418 may indicate that the initial pose estimate is adequate, or that it requires further refinement. Also in the first mode, the pose 416 and confidence/accuracy 418 determined by the pose tracking/refinement block 412 may be used in the post-processing module 404 to determine a refined pose estimate of the robot. Meanwhile, the global localization block 414 may be skipped. Further, the pose estimate 416 derived during pose tracking/refinement 412 may be treated as the initial pose estimate 420 of the robot for use in subsequent pose estimations.

In a second mode, the pose estimation module 402 may have no initial indication of where the robot is within the environment. In other words, the initial pose estimate 420 may not yet be determined. In the second mode, the pose estimation module 402 may utilize global localization 414 rather than pose tracking/refinement 412 to determine the pose of the robot. The global localization block 414 may test associations between the detected landmarks and mapped landmarks across the entire environment of the robot. The global localization block 414 may also output a pose estimate 416 and confidence/accuracy 418. Also in the second mode, the pose 416 and confidence/accuracy 418 determined by the global localization block 414 may be used in the post-processing module 404 to determine a refined pose estimate of the robot. Further, the pose estimate 416 derived during global localization 414 may be treated as the initial pose estimate 420 of the robot for use in subsequent pose estimations.

A post-processing module 404 may be used to refine the pose estimation derived from the pose tracking/refinement or global localization. The post-processing module 404 may perform fusion extrapolation 422 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module 404 may provide a map update 424 based on the provided confidence/accuracy and refined pose estimate. For example, the map update 424 may update locations of the mapped landmarks based on the refined pose estimate. In other examples, the map update may update statistical information associated with the mapped landmarks used to generate the refined pose estimation.

Each of the functions performed by the robot control system of FIG. 4 may be performed periodically. For example, navigation scanner 410 may perform scans at 8 Hz, while the wheel odometry 408 may update at 100 Hz. As another example, the processing blocks 412 and 414 of the pose estimation module may receive data from the on-board sensing module at 8 Hz, and may produce poses 416 and confidence/accuracies 418 at 8 Hz. Different frequencies are possible as well.

FIGS. 5A, 5B, 5C, 5D, and 5E illustrate a robot localization and mapping scenario, in accordance with example embodiments. The scenario may take place in an environment 500 with a number of fixed reflectors or other markers that are used to assist a robot in localization. In some examples, the environment 500 may be a warehouse. In other examples, the environment 500 may be a different indoor or outdoor environment with a marker setup.

Figure 5A:
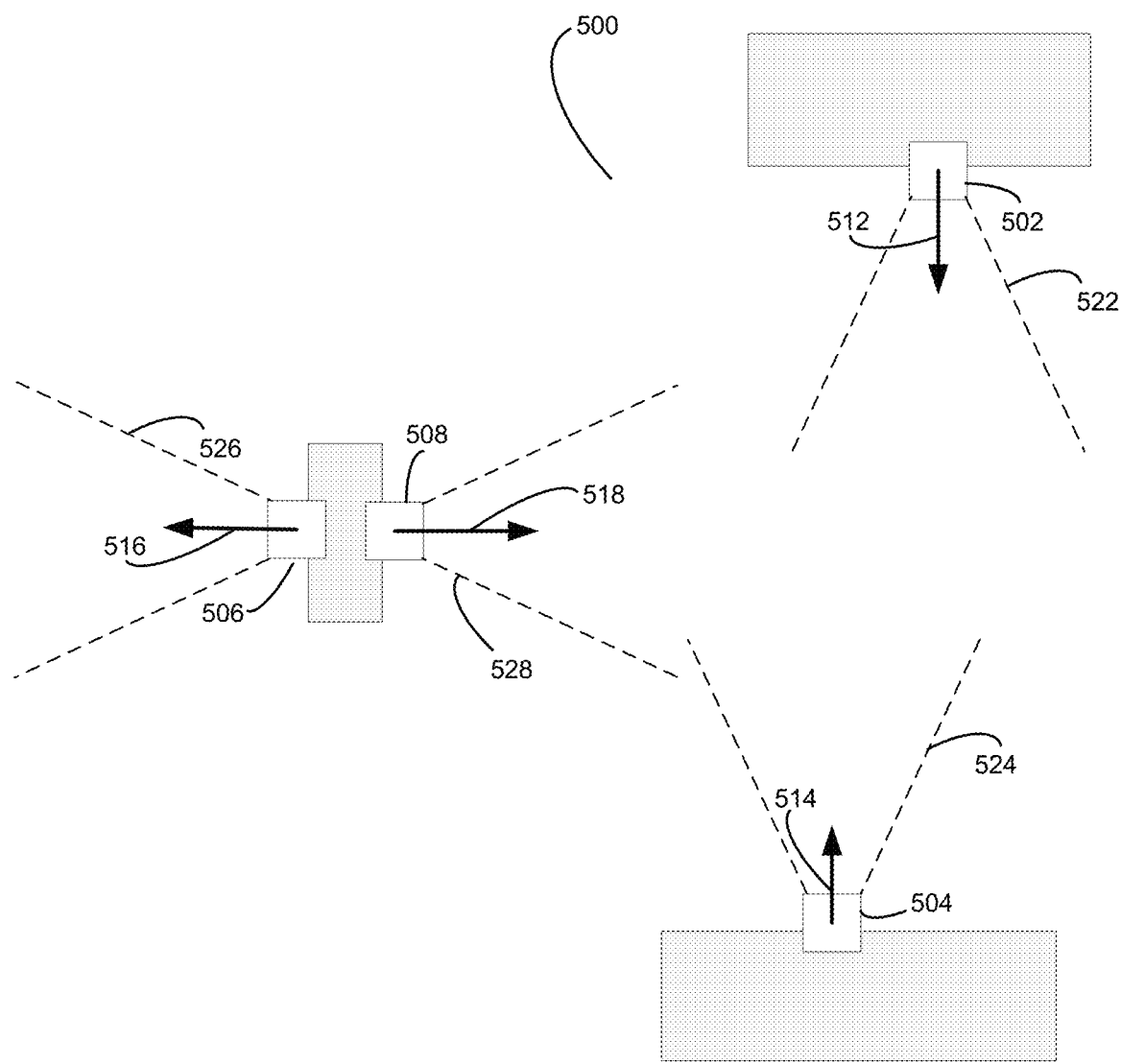
FIGS. 5A, 5B, 5C, 5D, and 5E illustrate a robot localization and mapping scenario, in accordance with example embodiments.

FIG. 5A illustrates fixed reflectors that may be represented in a map of the environment 500. In particular, the map is a digital representation of the environment 500. The environment 500 may include reflectors 502, 504, 506, and 508 fixed at different locations in environment 500. Each reflector may be fixed along a substantially horizontal plane. Additionally, each reflector may have a limited field of visibility from which the reflector may be detected by a sensor such as a lidar on a robotic device. For instance, each reflector may be a substantially flat reflector with a cone of visibility extending out from the reflector. In other examples, each reflector may include a curved surface or a different geometry that permits a limited field of visibility.

In reference to FIG. 5A, reflector 502 has a field of visibility 522, reflector 504 has a field of visibility 524, reflector 506 has a field of visibility 526, and reflector 508 has a field of visibility 528. The field of visibility of each reflector may depend on the reflector's position and orientation. The orientation of each reflector may be represented by a marker normal that is perpendicular to the face of the reflector. In particular, reflector 502 may have an orientation represented by marker normal 512, reflector 504 may have an orientation represented by marker normal 514, reflector 506 may have an orientation represented by marker normal 516, and reflector 508 may have an orientation represented by marker normal 518. Each marker normal may be a two-dimensional vector that represents the orientation of a reflector in a horizontal two-dimensional xy-plane.

A map of environment 500 may be processed to identify co-located reflectors. In particular, a pair of reflectors are referred to as co-located if the two reflectors are within a threshold distance $d_t$ of each other. This threshold distance may be determined based on the resolution of a sensor used by a robotic device in environment 500 to detect reflectors for localization. For instance, the threshold distance may be set at one meter. In the example shown in FIG. 5A, reflectors 506 and 508 may be identified as co-located reflectors based on their proximity to each other. Reflectors 502 and 504 may be identified as reflectors which do not have any co-located reflectors.

In some examples, identification of co-located reflectors may be done as a preprocessing step by a robotic device when the robotic device receives a map of reflectors. In particular, the robotic device may construct a lookup table of co-located reflectors by evaluating V pairs $(x_i, x_j)$, colocated $(x_i, x_j)$=true if $\|x_i-x_j\|_2 < d_t$ and false otherwise. The lookup table may be referenced to efficiently associate observations with mapped markers as part of a SLAM process. In other examples, co-located reflectors may instead be identified on the fly during SLAM.

Figure 5B:
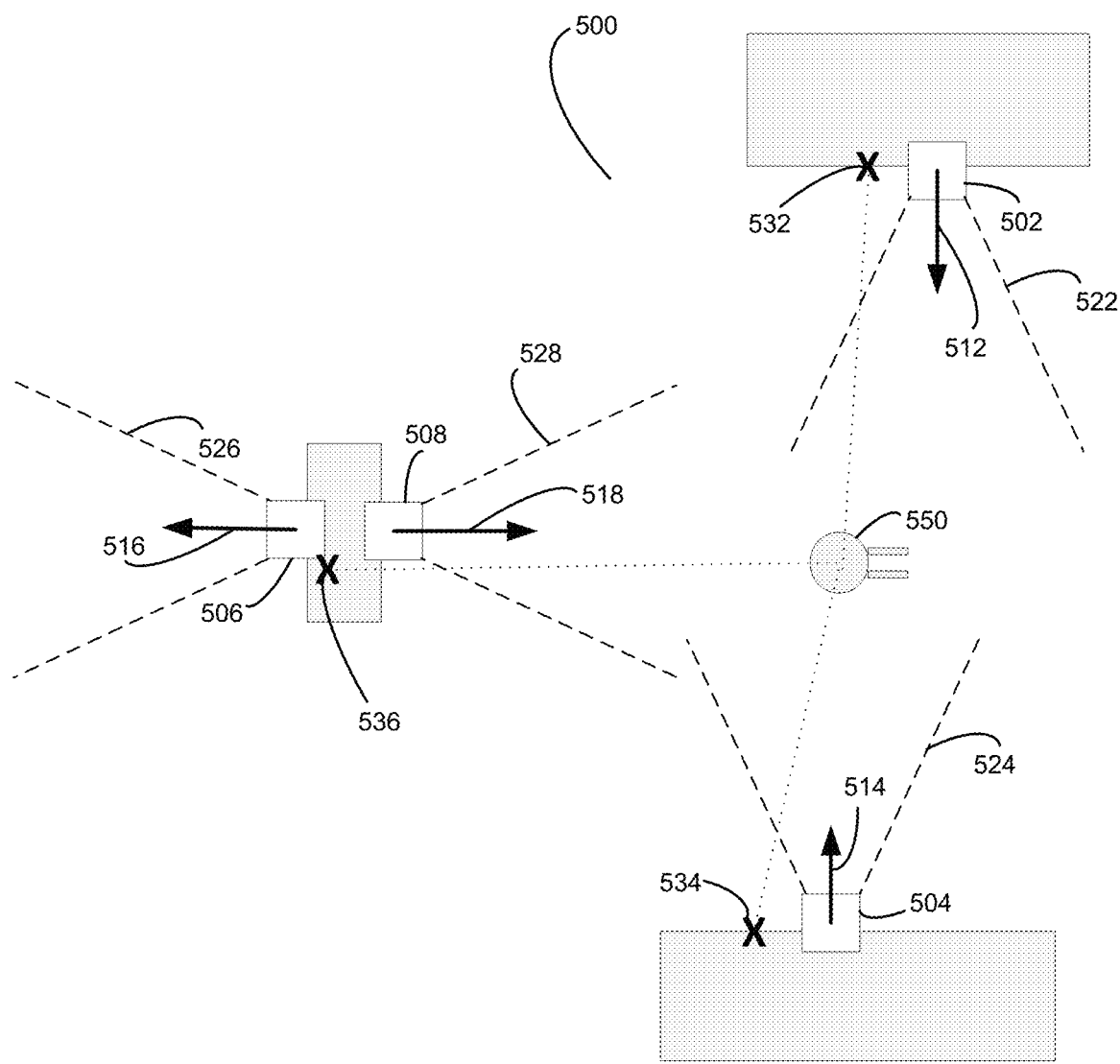

FIG. 5B shows a robotic device 550 operating in the environment 500. More specifically, the robotic device 550 may detect reflectors in the environment 500 and relate the detected reflectors to a map of reflectors in the environment 500 for localization. During the localization process, the robotic device 550 may also update information about the markers in the map.

In reference to FIG. 5B, robotic device 550 may process sensor data from a lidar sensor or other distance sensor in order to measure the positions of detections 532, 534, and 536 relative to the robotic device 550. The detections may represent true detections of mapped reflectors or they may represent false detections. The robotic device 550 may associate individual detections with corresponding mapped reflectors. These associations may be used both to refine the pose of the robotic device 550 in the environment 500 and also to refine the position information of individual reflectors in the map. In some examples, the associations may also be used to refine orientation information of individual reflectors in the map as well.

The robot localization algorithm may be an ICP search for the transformation $_M T_t^V$ that best maps observed reflectors in a scan S to the map. The ICP search may be seeded with the last estimated pose of the robot in the map frame $_M T_{t-1}^V$. Consequently, an inaccurate robot pose and/or inaccuracies in lidar data may cause detections to be related to inaccurate positions in the map. In the case of co-located reflectors, an observation may initially be placed in the map closer to a different co-located reflector than the one that was actually detected. For instance, in reference to FIG. 5B, a location in the map for observation 536 may initially be determined to be closer to mapped reflector 506 than mapped reflector 508 even though robot 550 actually detected mapped reflector 508.

Figure 5C:
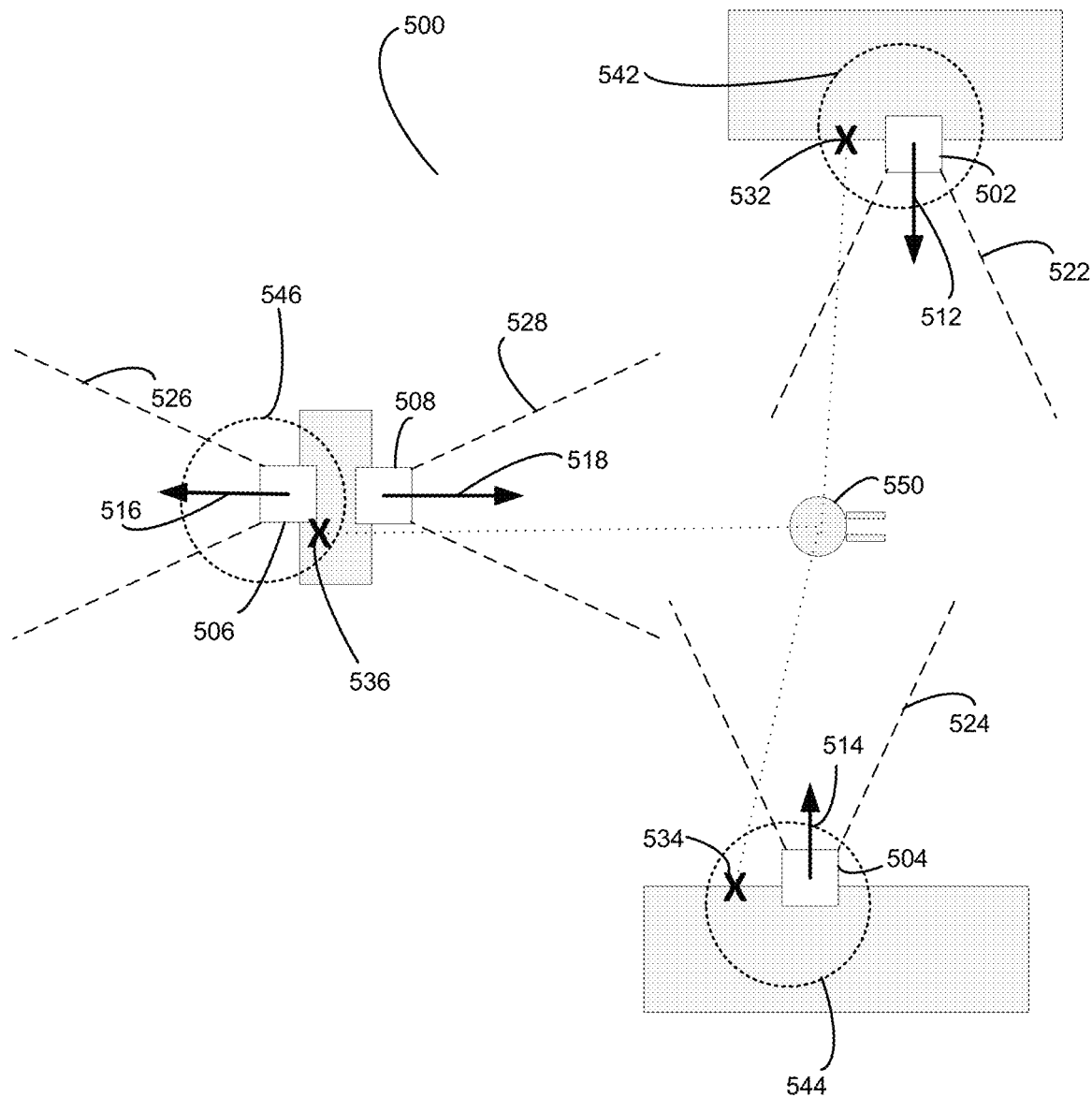

FIG. 5C illustrates associations between detections and corresponding mapped reflectors. More specifically, a detection and a mapped reflector may initially be associated based on distance. In FIG. 5C, association 542 is determined between reflector 502 and detection 532, association 544 is determined between reflector 504 and detection 534, and association 546 is determined between reflector 506 and detection 536.

This data association step where reflector observations in a current sensor scan are matched with existing reflectors in the map may be done as part of a SLAM process. In order to associate a detection with a corresponding mapped marker, an ICP search may rely on a nearest neighbor search to iteratively re-estimate the best corresponding marker $x_j$ in the map for an observation $r_i$. This nearest neighbor search may be based on a distance transform which enables a fast grid-based lookup to find the two-dimensional (X,Y) coordinates and an identifier of the nearest reflector. This discretization by position only does not handle the case of co-located flat reflectors—it will return the index of only one of the co-located reflectors in that particular grid cell.

Figure 5D:
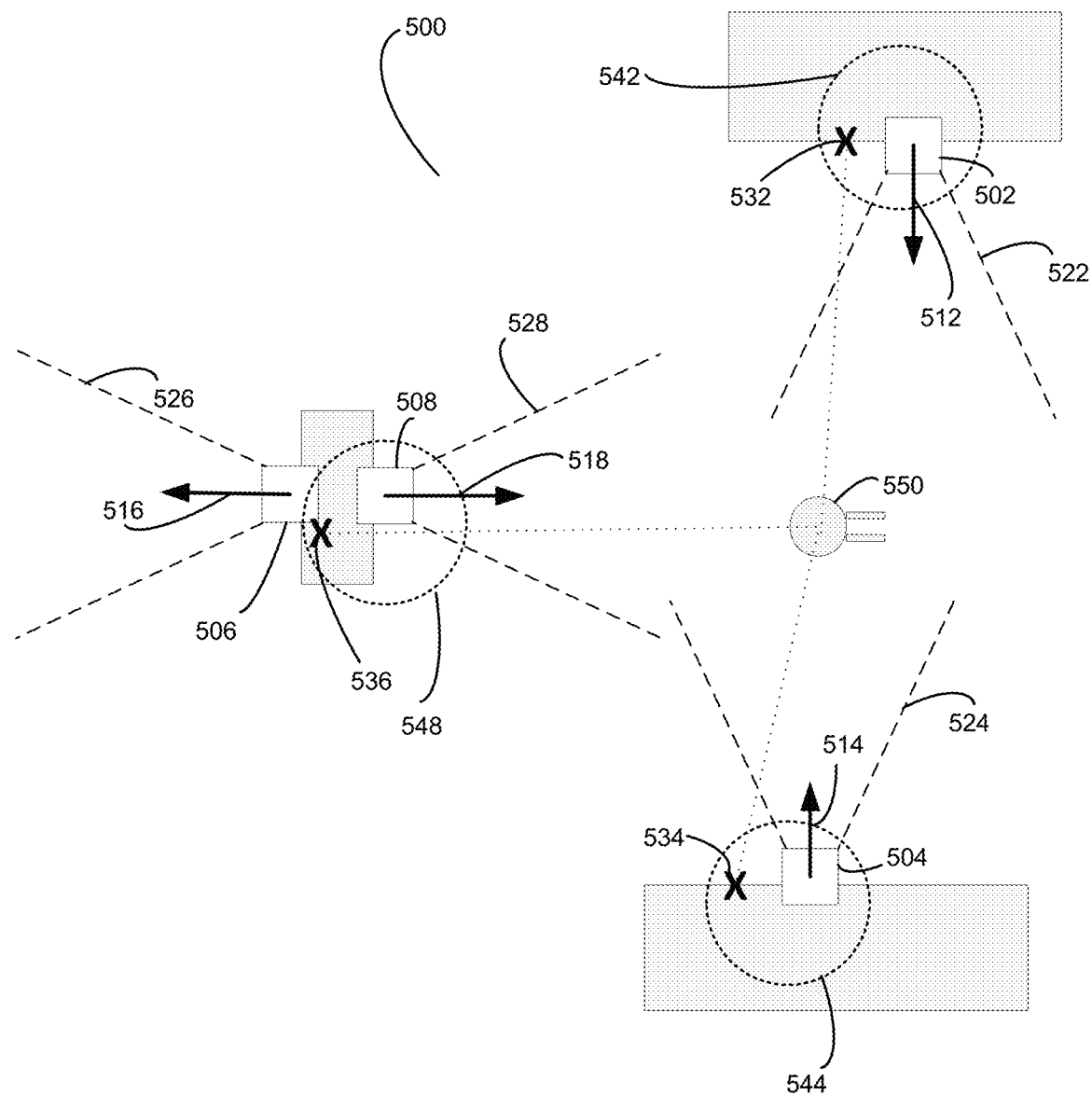

FIG. 5D illustrates an adjusted association of an observation to a different co-located reflector. In particular, the association 546 of FIG. 5C between reflector 506 and detection 536 may be rejected based on a visibility constraint. The visibility constraint may be enforced for co-located reflectors to verify that an observation is associated with a mapped reflector that is visible from the current position of robot 550. In the situation illustrated in FIG. 5D, an association between observation 536 and reflector 506 may be rejected because robot 550 is not within the field of visibility 526 of reflector 506. Instead, a different association 548 may be determined between observation 536 and reflector 508.

When finding the correspondences between the observations in scan S to the map, a visibility constraint may be applied and a lookup table of co-located reflectors may also be referenced. In some cases, there may be more than one co-located reflector to check when a correspondence to a mapped marker is identified. In such cases, the closest mapped reflector which is visible from the robot's current observation point p may be identified and associated with the detection. The following pseudocode represents functions that may be carried out to find an association with a particular mapped marker from a group of co-located mapped markers:

for each observation $r_{t_n}^i$ in scan at time $t_n$ observed from p:
   $x_j$=NearestNeighborGridSearch ($r_i$, Map)
   If IsDetectable ($x_j$, $r_i$, p)
     return $x_j$
   for all reflectors $x_k$ co-located with $x_j$:
     If IsDetectable ($x_k$, $r_i$, p)
       If IsCloser ($x_k$, $r_i$)
         Best_match=$x_k$
   return Best_match In some examples, a visibility constraint may only be enforced for mapped reflectors which have at least one co-located reflector. The visibility constraint may otherwise be turned off to avoid rejected valid correspondences and to save unnecessary processing. For instance, in reference to FIG. 5D, the visibility constraint may not be enforced for reflectors 502 and 504.

Figure 5E:
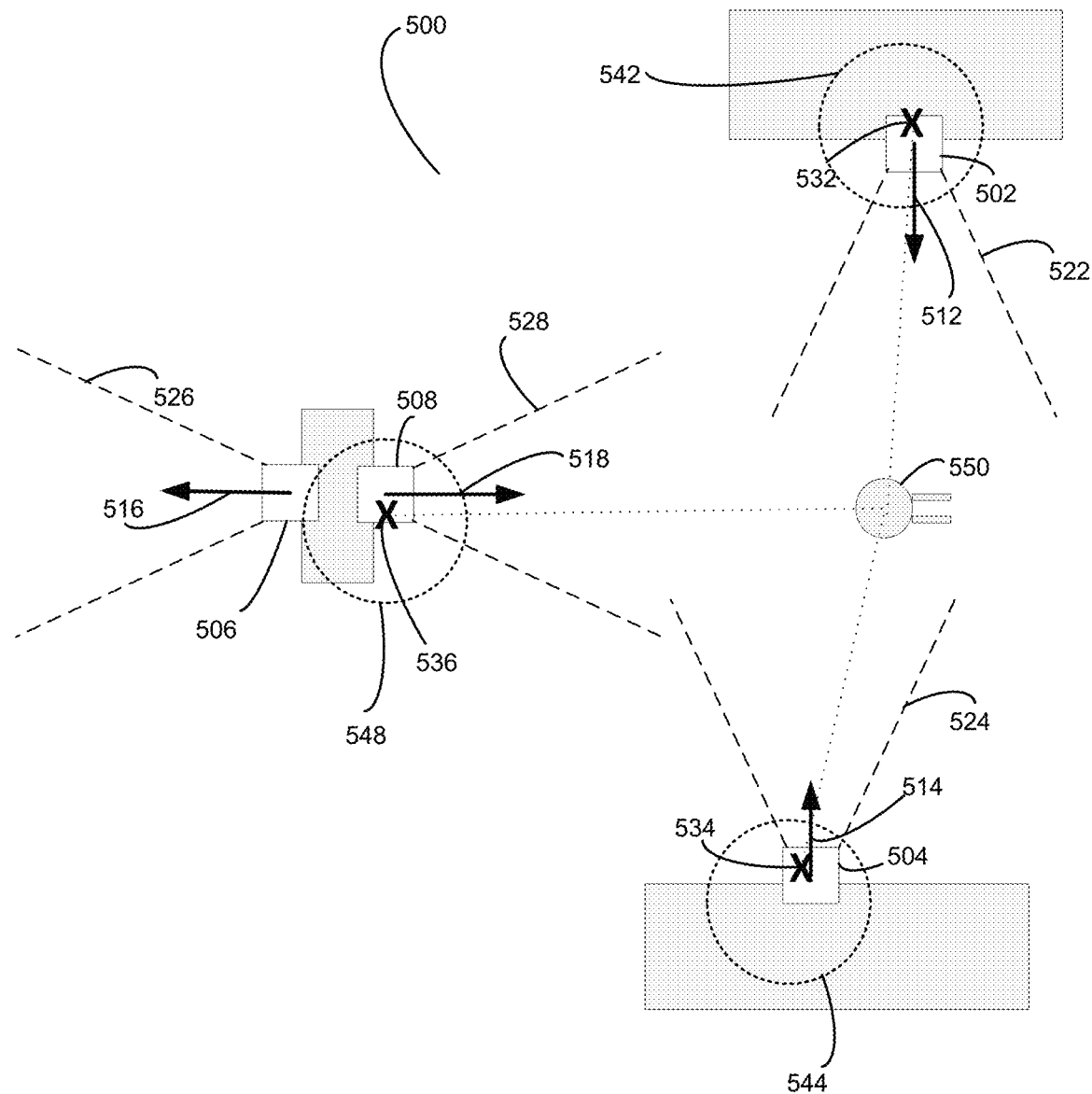

FIG. 5E shows an adjusted pose of robotic device 550 in environment 500. More specifically, the associations 542, 544, and 548 shown in FIG. 5E may be used as part of an ICP process to refine the pose of robotic device 550 in order to align observation 532 with reflector 502, observation 534 with reflector 504, and observation 536 with reflector 508. By enforcing a visibility constraint with respect to co-located reflectors 506 and 508, the localization estimate for robotic device 550 may thus be improved. In further examples, the associations 542, 544, and 548 may also be used to adjust the (X,Y) positions and/or the orientations of one or more of reflectors 502, 504, and 508 in the map as well.

Figure 6:
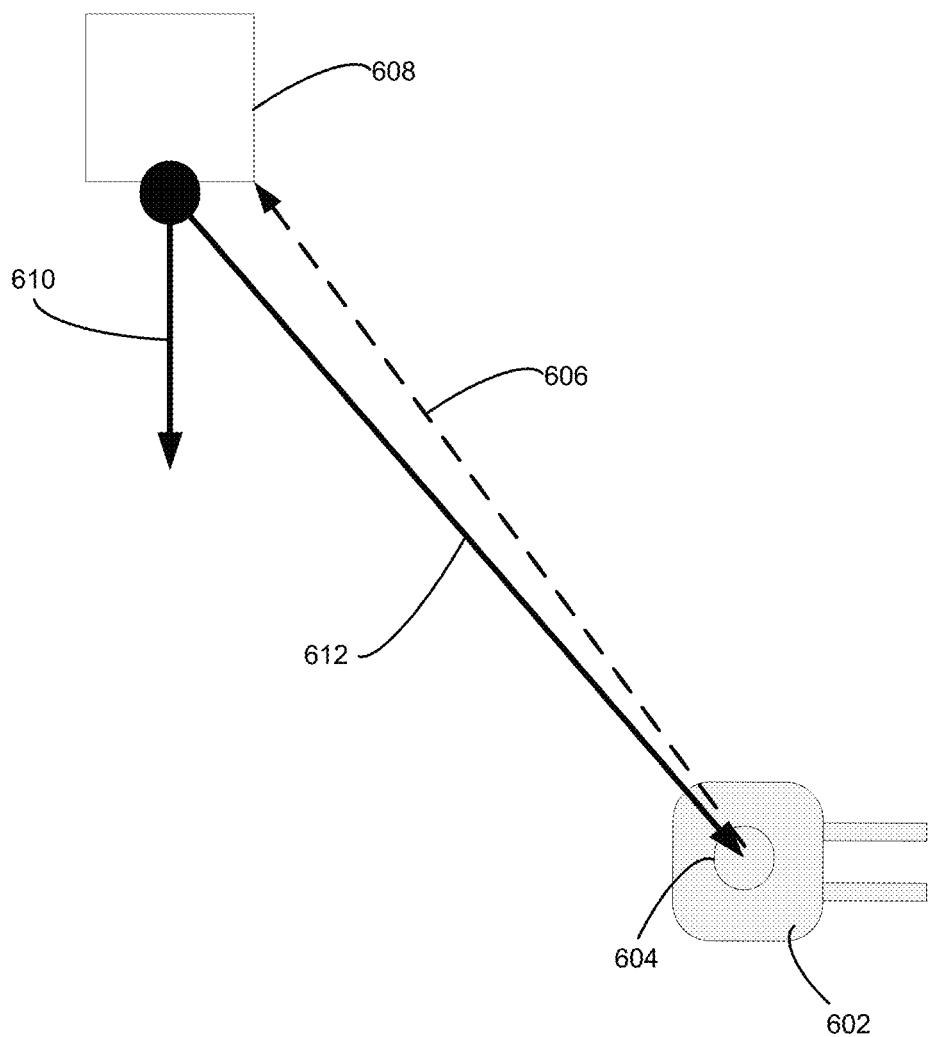
FIG. 6 illustrates an observation and a measurement ray, in accordance with example embodiments.

FIG. 6 illustrates an observation and a measurement ray, in accordance with example embodiments. More specifically, a robot 602 with sensor 604 may detect an observation 606. In order to determine whether to associate the observation 606 with mapped marker 608, a visibility constraint may be enforced. To determine whether mapped marker 608 is visible by sensor 604 on robot 602, a measurement ray 612 between the position of mapped marker 608 in the map and the current position of the sensor 604 may be determined. The angle between marker normal 610 and measurement ray 612 may then be compared to a threshold angle to determine whether the marker normal 610 is consistent with the field of visibility of the marker 608. This determination may involve computing a dot product between marker normal 610 and measurement ray 612. FIG. 6 illustrates how a visibility constraint may be enforced for a co-located marker during the data association step of a SLAM process.

More specifically, a map of n reflectors $\{x_1, x_2, \ldots x_n\}$ may be determined with orientations represented by normal vectors $\{n_1, n_2, \ldots n_n\}$. At each timestep, a vector of m observations of the (x,y) positions of all visible reflectors may be determined from a lidar sensor: $S=\{r_1, r_2, \ldots r_m\}$. A nearest neighbor search may be used to find matches between observations from a current lidar position p and the reflectors in the map. A weight may be applied to matches when evaluating the visibility constraint: $w_{ij}=1$ if $\|x_j+r_j\|_2<d_t$ and $t_{px_j} \cdot n_j<\cos(\theta_t)$, and 0 otherwise. This equation checks that observed position of the reflector is within a threshold distance $d_t$ of the mapped reflector (e.g., 0.25 m). It also checks that the angle between the measurement ray $t_{px_j}$ (drawn between the mapped reflector and the current lidar position) and the reflector normal is consistent with the visibility cone of the reflector, by evaluating the dot product of the two vectors. Threshold angle $\theta_t$ may be set to an empirically derived value (e.g., 75°), which represents how oblique to the reflector's normal the lidar can be to detect the reflector.

Each pair of co-located reflectors may be required to have a non-overlapping visibility region to ensure that two co-located reflectors are not both visible from a position of the robot. The non-overlapping visibility region may be enforced in reflector layout tools and during SLAM when maps are created. As an example, two co-located reflectors may be positioned so that they are oriented in opposite directions. As another example, two co-located reflectors may be positioned so they are oriented at a right angle to each other.

Figure 7:
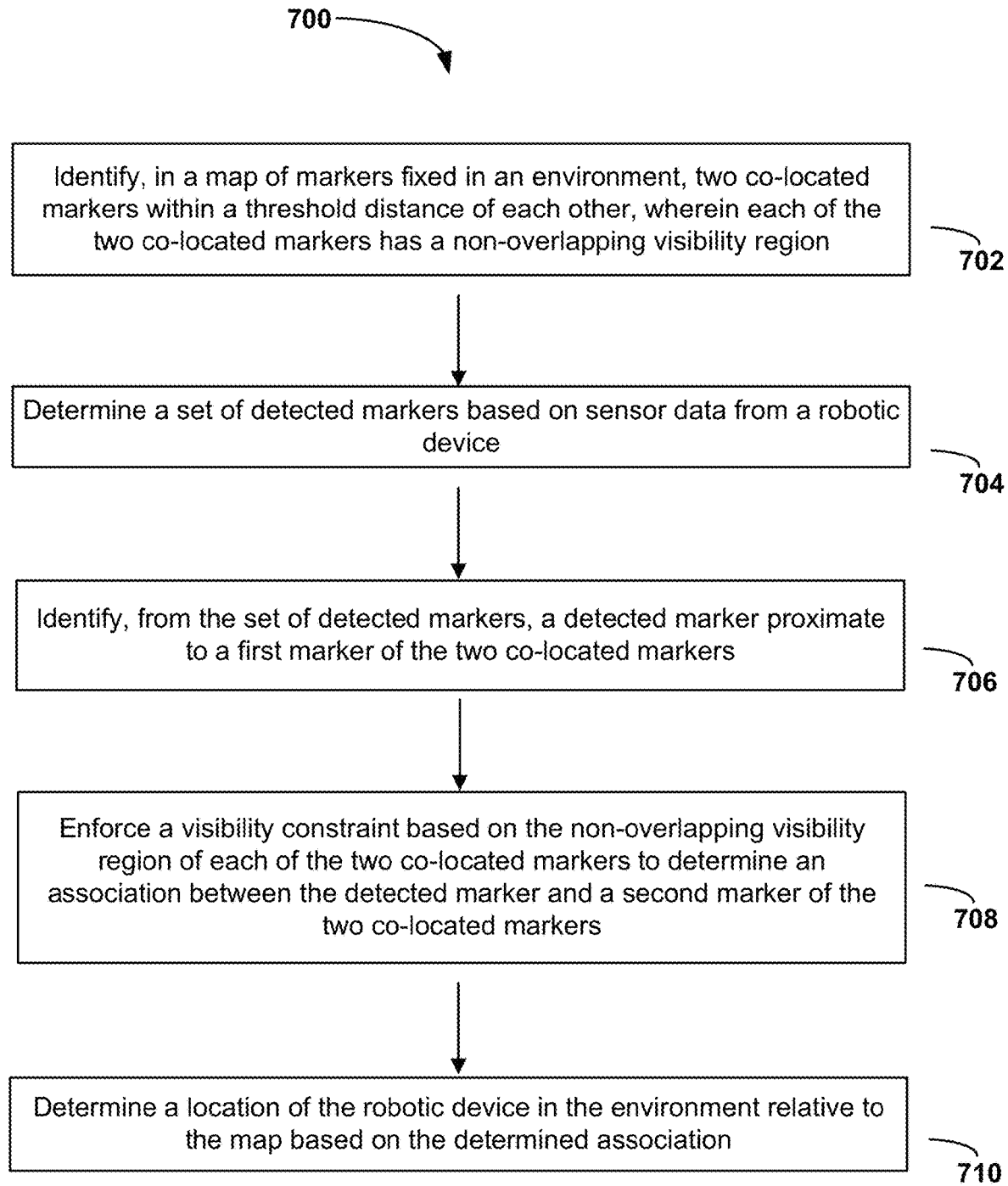
FIG. 7 is a block diagram of a method, in accordance with example embodiments.

FIG. 7 is a block diagram of a method 700, in accordance with example embodiments. In some examples, the method may be carried out by a robotic device or by a control system of such a device. For example, blocks 702, 704, 706, 708, and 710 may be carried out by one or more processors on the robotic device executing program instructions stored on a non-transitory computer readable medium. In other examples, the method may be carried out by a computing system separate from the robotic device. In these examples, a non-transitory computer readable medium may store instructions executable by one or more processors to cause the computing system to perform the blocks of the method. In these examples, the one or more processors and non-transitory computer readable medium may perform the blocks remotely. In still other examples, portions of the method may be carried out remotely, while other portions may be carried out at the robot.

At block 702, method 700 includes identifying, in a map of markers fixed in an environment, two co-located markers within a threshold distance of each other. The threshold distance may be set based on a resolution of a sensor on a robotic device (e.g., one meter). Each of the two co-located markers may have a non-overlapping visibility region. Accordingly, a visibility constraint may be effective to distinguish between co-located markers when associating an observation.

The map of markers includes a location and an orientation of each marker. The map may be stored in a digital format readable by a robotic device. The locations of the markers may be two-dimensional locations in a substantially horizontal plane (e.g., the markers may all be fixed at approximately the same height in the environment). The orientations may be two-dimensional vectors in the horizontal plane. Each marker in the map may be substantially flat such that the orientation of each marker corresponds to a marker normal. In some examples, each marker is a retro-reflective marker detectable using a laser-based sensor on a robotic device.

At block 704, method 700 includes determining a set of detected markers based on sensor data from a robotic device. These observations may be aligned with a map frame based on a current location of a robotic device relative to the map and based on sensor data from the robotic device. The pose of the robotic device may be determined iteratively as part of a SLAM process. The last estimated pose of the robotic device may be used to relate observed reflectors to the map. The sensor data may include distance measurements from a lidar sensor on the robotic device. In some examples, the sensor itself may include a component that preprocesses raw sensor data (e.g., to align detections with a particular coordinate frame).

At block 706, method 700 includes identifying, from a set of detected markers, a detected marker proximate to a first marker of the two co-located markers. In particular, the identified marker may be a closest marker to the detected marker based on a nearest neighbor search. This initial identification may be carried out based on distance without depending on the orientation of the identified marker.

At block 708, method 700 includes enforcing a visibility constraint based on the non-overlapping visibility region of each of the two co-located markers to determine an association between the detected marker and a second marker of the two co-located markers. The visibility constraint may be checked based on the current orientation of each of the co-located mapped markers. In particular, checking the visibility constraint may involve using the orientation stored in the map to determine whether the robot's sensor is within the field of visibility of each marker. Based on the first marker not being visible and the second marker being visible from the robot's current position, the second marker may instead be associated with the observation.

At block 710, method 700 includes determining a location of the robotic device in the environment relative to the map based on the determined association. In particular, the adjusted association to a different one of the co-located markers may improve the robot localization estimate. For instance, an ICP algorithm may yield a transformation that indicates the pose of the robot and more accurately relates detected markers in a sensor scan to the map of markers than would have been the case if the association to a different co-located marker was used.

Robot localization information generated as part of the method 700 may be used to control a robot to operate in an environment. Processing a map to identify co-located markers may improve a control system's ability to cause the robot to navigate or perform other operations in the environment. Such operations may involve any number of different robot tasks which may depend on accurate robot localization information.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    determining locations of a plurality of mapped markers in a map of an environment of a robotic device;
    determining a visibility region for each of the plurality of mapped markers;
    detecting a set of detected markers based on sensor data from the robotic device;
    identifying a plurality of matches between detected markers and mapped markers such that each match includes a detected marker within a threshold distance of a mapped marker, wherein the mapped marker satisfies a visibility constraint based on the visibility region of the mapped marker and a current position of the robotic device; and
    determining a location of the robotic device in the environment relative to the map based on the plurality of matches.

2. The method of claim 1, wherein a nearest neighbor search is used to identify the plurality of matches between detected markers and mapped markers.

3. The method of claim 2, wherein the nearest neighbor search comprises a grid search, and wherein the grid search returns a grid cell that includes at least one of the plurality of mapped markers for each detected marker.

4. The method of claim 1, wherein each mapped marker in the map is substantially flat, and wherein each mapped marker has a respective visibility cone.

5. The method of claim 4, further comprising determining whether a given marker satisfies the visibility constraint by determining whether an angle between a measurement ray and a marker normal is consistent with the respective visibility cone for the given marker.

6. The method of claim 5, wherein the measurement ray comprises a ray between a mapped position of the given marker and a current sensor position of a sensor on the robotic device.

7. The method of claim 5, wherein determining whether the angle between the measurement ray and the marker normal is consistent with the respective visibility cone for the given marker comprises evaluating a dot product of the measurement ray and the marker normal.

8. The method of claim 1, wherein determining the visibility region for a given mapped marker comprises determining a threshold angle, wherein the threshold angle is an empirically derived value representing a maximum angle between a sensor and a marker normal in which the given mapped marker is still able to be detected.

9. The method of claim 1, wherein the threshold distance is based on a resolution of a sensor on the robotic device used to generate the sensor data.

10. The method of claim 1, wherein the robotic device is mobile robotic device, the method further comprising navigating the robotic device in the environment based on determined location of the robotic device.

11. The method of claim 1, wherein the robotic device is mobile robotic device, the method further comprising refining a pose of the robotic device based on the plurality of matches.

12. The method of claim 1, wherein determining the location of the robotic device comprises using the plurality of matches for an iterative closest point localization algorithm which yields a transformation that relates detected markers in a sensor scan to the mapped markers.

13. The method of claim 1, wherein each of the mapped markers in the map is a retro-reflective marker, and wherein the sensor data is generated using a laser-based sensor on the robotic device.

14. The method of claim 1, wherein each of the plurality of mapped markers is fixed at substantially a same height within the environment.

15. The method of claim 1, further comprising storing an indication that two of the plurality of mapped markers comprise a pair of co-located markers in a lookup table, wherein the lookup table is referenced when identifying the plurality of matches.

16. The method of claim 15, wherein the plurality of mapped markers includes two co-located mapped markers with non-overlapping visibility regions.

17. The method of claim 16, wherein the two co-located mapped markers are oriented in substantially opposite directions to each other.

18. The method of claim 16, wherein the two co-located mapped markers are oriented at a substantially a right angle to each other.

19. A robotic device comprising a control system configured to:
- determine locations of a plurality of mapped markers in a map of an environment of the robotic device;
- determine a visibility region for each of the plurality of mapped markers;
- detect a set of detected markers based on sensor data from the robotic device;
- identify a plurality of matches between detected markers and mapped markers such that each match includes a detected marker within a threshold distance of a mapped marker, wherein the mapped marker satisfies a visibility constraint based on the visibility region of the mapped marker and a current position of the robotic device; and
- determine a location of the robotic device in the environment relative to the map based on the plurality of matches.

20. A non-transitory computer readable medium comprising program instructions executable by at least one processor to cause the at least one processor to perform functions comprising:
- determining locations of a plurality of mapped markers in a map of an environment of a robotic device;
- determining a visibility region for each of the plurality of mapped markers;
- detecting a set of detected markers based on sensor data from the robotic device;
- identifying a plurality of matches between detected markers and mapped markers such that each match includes a detected marker within a threshold distance of a mapped marker, wherein the mapped marker satisfies a visibility constraint based on the visibility region of the mapped marker and a current position of the robotic device; and
- determining a location of the robotic device in the environment relative to the map based on the plurality of matches.

* * * * *